(No Model.) 2 Sheets—Sheet 1.

D. LUPTON.
REFRIGERATOR.

No. 309,151. Patented Dec. 9, 1884.

Witnesses:
John M. Clayton
Harry Drury

Inventor:
David Lupton
by his Attys.
Howson and Son

UNITED STATES PATENT OFFICE.

DAVID LUPTON, OF PHILADELPHIA, PENNSYLVANIA.

REFRIGERATOR.

SPECIFICATION forming part of Letters Patent No. 309,151, dated December 9, 1884.

Application filed October 2, 1884. (No model.)

*To all whom it may concern:*

Be it known that I, DAVID LUPTON, a citizen of the United States, and a resident of Philadelphia, Pennsylvania, have invented certain Improvements in Refrigerators, of which the following is a specification.

My invention relates to that class of refrigerators in which the provision-chamber is circular for the reception of rotating shelves, my invention, which is fully described and claimed hereinafter, having for its object the construction of a refrigerator of this class in such a manner as to simplify the same without impairing its efficiency.

Figure 1:
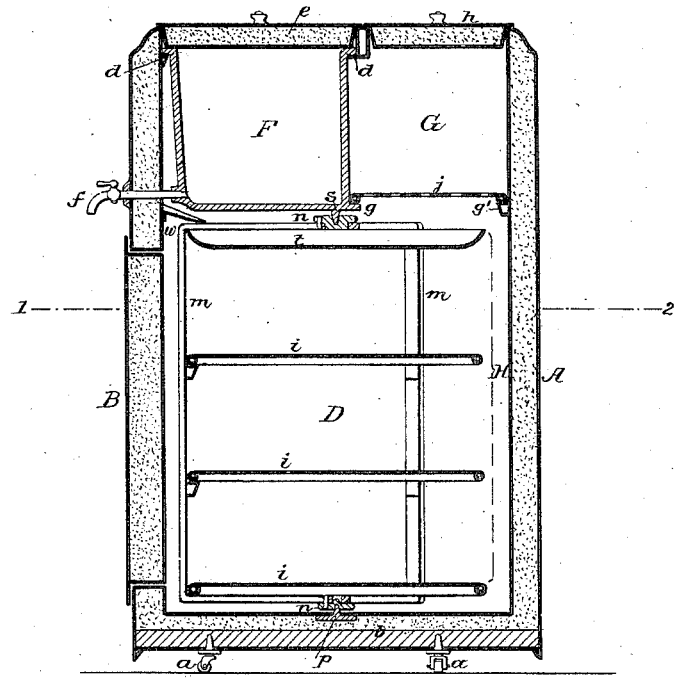
Figure 2:
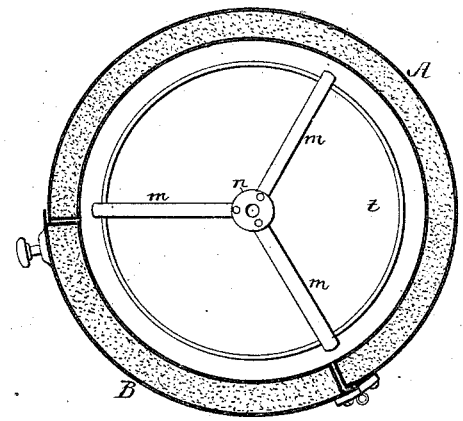
Figure 3:
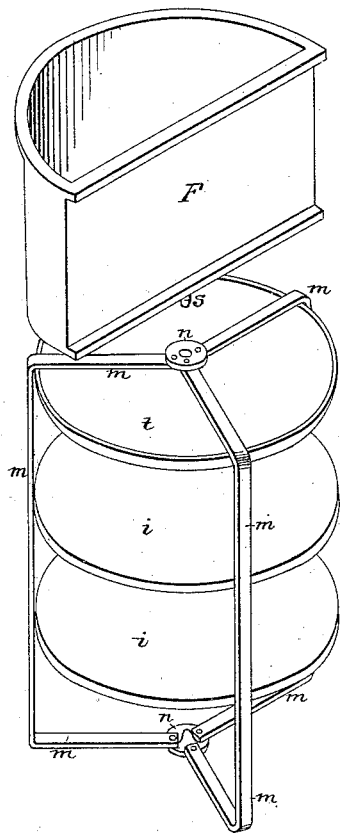

In the accompanying drawings, Figure 1, Sheet 1, is a vertical section of the refrigerator made according to my invention; Fig. 2, a sectional plan view of the casing on the line 1 2, the internal cage being shown in plan; and Fig. 3, Sheet 2, a perspective view of parts of the refrigerator detached from the outer casing of the same.

The refrigerator is circular in cross-section, and has a double casing, A, suitably packed with non-conducting material, and having in one side an opening closed by a door, B, similarly packed, the casing being mounted upon casters $a$, and the stems of these casters projecting into a wooden block, $b$, secured within the lower portion of the casing A, so as to provide a firm support for the casters and prevent the same from working loose, as they would if they had no other means of support than the sheet-metal casing. Within the casing is the provision-chamber D, in the upper portion of which is the vessel F, for containing ice, said vessel having round its upper edge a flange resting upon suitable ribs or flanges, $d$, in the casing, and being closed at the top by means of a removable lid, $e$. The vessel F has the usual spigot, $f$, for drawing therefrom the water resulting from the melting of the ice.

In the rear of the chamber F is the provision-chamber G, having a grated bottom, $j$, which rests upon a flange, $g$, at the rear of said vessel F and upon a rib, $g'$, secured to the casing A, this chamber being provided with a removable cover, $h$.

Within the provision-chamber D is a rotating cage, H, consisting of a series of trays or shelves, $i$, connected together by a frame, $m$, and having at the upper and lower ends plates $n$. The lower plate $n$ has a recess for the reception of a pin, $p$, carried by a plate secured to the bottom of the casing A, and the upper plate $n$ has a similar recess for the reception of a lug, $s$, projecting from the under side of the vessel F, the cage H being thus pivoted so as to be free to turn within the chamber D, so that the contents of any of the shelves can be readily reached through the doorway of the refrigerator. The top of the cage H consists of a dished plate, $e$, which receives the water of condensation dropping from the vessel F and prevents the same from gaining access to the provisions on the shelves $i$. A tray, $w$, is placed beneath the stem of the spigot $f$ where the latter enters the vessel F, this tray serving to collect and convey to the plate $t$ any drip from the spigot or any leakage around the same. The grated bottom $j$ of the chamber G can be readily removed when it is desired to clean the same or to gain access to the dished top of the cage for the purpose of removing therefrom the water which has accumulated therein.

As the provision-cage of my improved refrigerator is composed of a series of shelves or trays supported by an outer skeleton frame, the entire surface of each shelf is available for the reception of provisions, thus overcoming an objection to that class of provision-cages which have a central post extending from top to bottom.

I claim as my invention—

1. The combination of the casing A, the receptable F, having a pin, $s$, and a cage, H, consisting of an outer skeleton frame and a series of shelves, said cage having a lower bearing in the casing and an upper bearing on said pin $s$, as set forth.

2. The combination of the casing A, having an internal rib, $g'$, the ice-receptacle F, located in the upper portion of the casing, and having a flange, $g$, and the plate J, resting upon the said flange $g$ and rib $g'$, as set forth.

3. The combination of the casing A, the ice-receptacle F, and the pivoted cage H, the latter having at the top a dished plate, $t$, for receiving the moisture which collects upon the outside of said ice-receptacle, as set forth.

4. The combination of the casing, the ice-receptacle, the cage H, having a dished plate, $t$, the spigot $f$, and the tray $w$, as set forth.

5. The within-described provision-cage H, the same consisting of a series of shelves, $i$, an outer skeleton frame, $m$, and top and bottom plates, $n$ $n$, as set forth.

In testimony whereof I have signed my name to this specification in the presence of two subscribing witnesses.

DAVID LUPTON.

Witnesses:
 JOHN M. CLAYTON,
 HARRY SMITH.